United States Patent [19]

Rodriguez-Cavazos et al.

[11] Patent Number: 4,939,429
[45] Date of Patent: Jul. 3, 1990

[54] HIGH VOLTAGE REGULATOR CIRCUIT FOR PICTURE TUBE

[75] Inventors: Enrique Rodriguez-Cavazos, Indianapolis, Ind.; Hans-Günter Bicheler, VS-Villingen, Fed. Rep. of Germany

[73] Assignee: RCA Licensing Corporation, Princeton, N.J.

[21] Appl. No.: 398,515

[22] Filed: Aug. 24, 1989

[51] Int. Cl.$^5$ .................... H01J 29/70; H04N 5/63; H04N 5/68
[52] U.S. Cl. .................... 315/411; 358/190; 358/243
[58] Field of Search ................. 315/411; 358/190, 243

[56] References Cited
U.S. PATENT DOCUMENTS
4,812,720 3/1989 Haferl .......................... 315/411

Primary Examiner—Gregory C. Issing
Attorney, Agent, or Firm—Joseph S. Tripoli; Joseph J. Laks; Sammy S. Henig

[57] ABSTRACT

A high voltage regulator circuit for maintaining the ultor voltage applied to a picture tube of a television receiver apparatus provides an auxiliary voltage signal for compensation of variations in the ultor voltage caused by variations in the beam current. An improved phase control circuit controls the phase position of the pulses of the auxiliary voltage signal so that they lag with only the leading parts thereof overlapping the retrace voltage signal pulses, in order to prevent the introduction of fluctuations in the ultor voltage due to secondary ringing. The phase control circuit includes a sawtooth waveform generator which generates a sawtooth signal corresponding to the retrace pulses, a reference voltage generator which generates a reference voltage corresponding to the ultor voltage, a comparator for comparing the sawtooth signal to the reference voltage, and a one-shot multivibrator circuit responsive to the comparator output for generating a pulse signal for the auxiliary pulses lagging in phase to the retrace pulses.

22 Claims, 6 Drawing Sheets

FIG. 2B PRIOR ART — LOW BEAM $I_v=0.2mA$ (AV); HIGH BEAM $I_v=1.2mA$ (AV); 8.3KVp.p.; 7.7KVp.p.; V2

FIG. 2C PRIOR ART — HIGH BEAM; LOW BEAM; V3 1.5KVp.p.

ULTOR VOLTAGE ($3 \times 8.66KV = 26KV$)
8.66KV LOW BEAM
HIGH BEAM

FIG. 2D PRIOR ART — $V_{SUM} = V2 + V3$; $t_a$; $t_b$

FIG. 2E PRIOR ART — V5; 1.5V; 0; -0.6V

FIG. 2F PRIOR ART — 2A; 1.1A; $i_1$; 0; HOR RETRACE; $t_r$ $t_1\ t_2\ t_3\ t_4$ … $t'_1\ t'_2\ t'_3\ t'_4$
LOW BEAM / HIGH BEAM

FIG. 3 — RINGING; V3'

HIGH VOLTAGE REGULATOR CIRCUIT FOR PICTURE TUBE

This invention relates to a high voltage power supply circuit for a television apparatus and, more particularly, to an improved circuit which regulates a high voltage applied to a picture tube by feedback control.

In television receiver or monitor circuits, an ultor accelerating voltage or high voltage for a picture tube is typically obtained by rectifying a retrace pulse voltage stepped up by a high voltage winding of a flyback transformer. The retrace pulse voltage is developed by a horizontal deflection circuit that is coupled to the high voltage winding via the primary winding of the flyback transformer. The horizontal deflection circuit has an output stage which includes a horizontal deflection winding, a retrace capacitor, and a trace switch including a damper diode and a horizontal output transistor.

In typical television receiver circuits, the raster size of the beam of a picture tube is inversely proportional to the square root of the ultor accelerating voltage. Because the high voltage circuit exhibits a certain amount of source impedance, increasing the beam current drawn from the ultor terminal will result in a decrease of the ultor accelerating potential. Ultor voltage variations resulting from variation of the beam current occur mainly due to a leakage inductance between the high voltage and the primary winding of the flyback transformer. The ultor voltage variations lead to reduced picture tube performance, which is manifested by undesirable raster size variations, reduced peak brightness, and poor focus at high beam currents.

Due to the demand for larger picture tubes having increased resolution and higher definition images, it is desirable to obtain improved regulation of ultor voltages over a wide range of beam current and brightness. An ultor voltage regulator circuit is disclosed in U.S. Pat. No. 4,812,720, entitled "High Voltage Stabilization Circuit For Video Display Apparatus", in the name of Peter E. Haferl (the Haferl patent). An example of this voltage regulator circuit is described below with reference to FIGs. 1 and 2a–2f.

Figure 1:
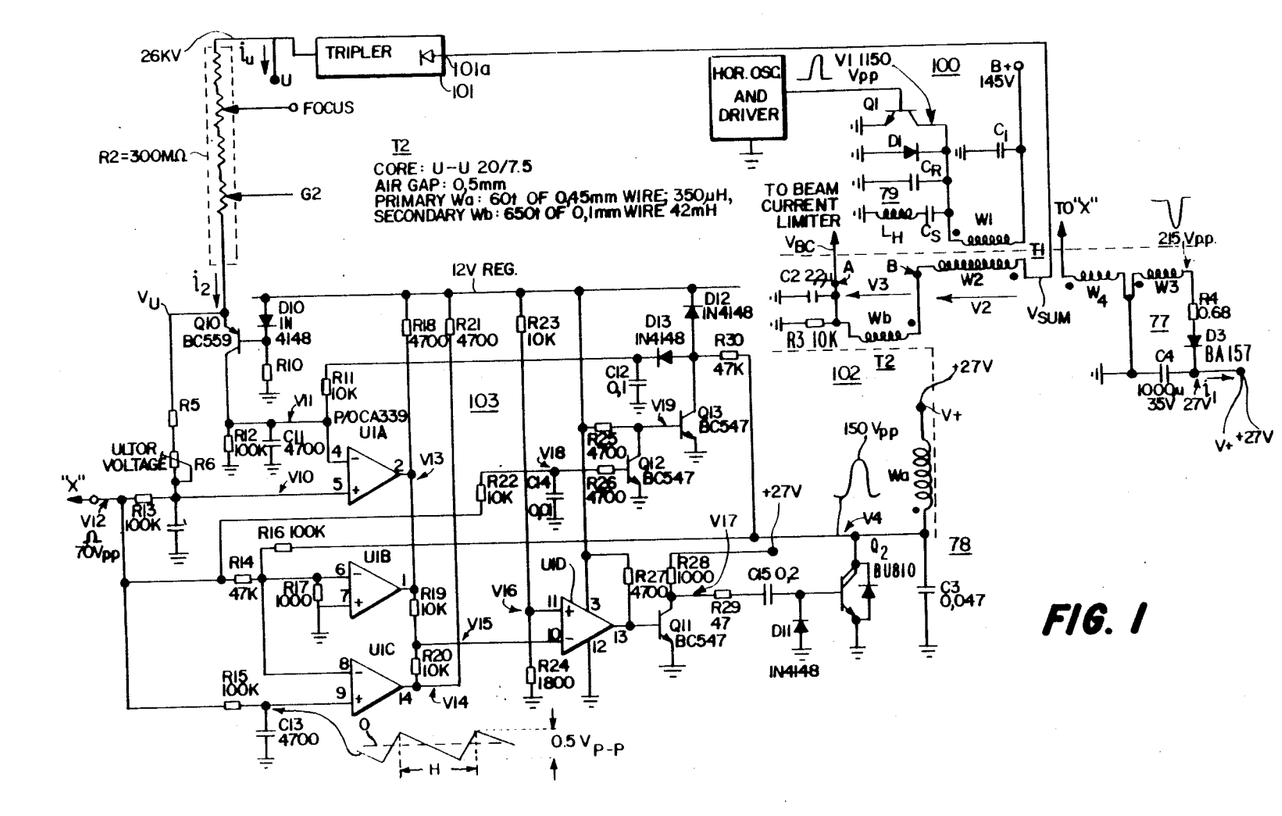
FIG. 1 is a circuit diagram illustrating a high voltage regulator circuit of the Haferl patent for a picture tube.

As shown in FIG. 1, the ultor voltage regulator circuit of the Haferl patent includes a horizontal deflection circuit 100 and a high voltage stabilization circuit 102 which generates a stabilized ultor voltage U. A switching transistor Q1 of the deflection circuit 100, responsive to a horizontal drive signal, generates a horizontal retrace voltage pulse V1 in a retrace or flyback resonant circuit 79 that is coupled via a primary winding W1 of a transformer T1 to a tertiary high voltage winding W2 to form a voltage pulse V2. A switching transistor Q2 of stabilization circuit 102, responsive to an output of a control circuit 103, generates a voltage pulse V4 that is coupled via a primary winding Wa of an auxiliary transformer T2 to an auxiliary voltage winding Wb to form a voltage pulse V3. Winding Wb is coupled in series with high voltage winding W2. The sum of the high voltage pulse V2, generated in winding W2, and of auxiliary voltage pulse V3, generated in winding Wb, is applied to a voltage tripler 101 which generates ultor voltage U in proportion to the peak value of the sum voltages.

As shown more clearly in FIGS. 2a–2f, the phase of the voltage pulse V3 is advanced relative to that of the voltage pulse V2. The phase is adjusted backward, or delayed by control circuit 103 such that voltage pulse V3 is in a more overlapping position, thereby adding to voltage pulse V2 at high beam current when the ultor voltage tends to drop. Thus, the peak value of the sum of voltage pulses V2 and V3, and, thereby, ultor voltage U, is maintained substantially constant despite variations in the beam current.

Assume a hypothetical arrangement similar to that of the Haferl patent but that, unlike the Haferl patent arrangement, does not utilize the voltage tripler. In such hypothetical arrangement, the number of winding turns in the transformers may be higher for obtaining the same level of the ultor voltage. Such hypothetical arrangement may be more susceptible to a particular kind of ringing. Should such ringing occur in a voltage V3' shown in FIG. 3 that is analogous to voltage pulse V3 of FIG. 2c, after, for example, a time that is analogous to time $t_3$ or $t_4$ of FIG. 2c, such ringing might affect the ultor voltage. Such ringing might introduce fluctuation in the peak value of the sum of voltage pulses that are analogous to voltage pulses V2 and V3. The fluctuation might occur particularly at high beam current, thereby causing fluctuations in ultor voltage U. The ringing might cause instability since the ringing might represent a phase reversal in the feedback loop signal path.

It may be desirable to regulate the ultor voltage in such a way that, should such ringing occur, it will not affect the ultor voltage.

A high voltage power supply of a video apparatus, embodying an aspect of the invention, includes a source of an input signal at a frequency that is related to a deflection frequency and a first flyback resonant circuit. First switching arrangement responsive to the input signal and coupled to the first flyback resonant circuit generates a periodic, resonant first flyback voltage at a reference phase that is developed across a high voltage winding of a flyback transformer. Second switching arrangement responsive to a control signal and coupled to a second flyback resonant circuit generates at a first terminal of the high voltage winding a periodic, resonant second flyback voltage at a controllable phase that is lagging relative to that of the first flyback voltage. The second flyback voltage is applied in series with the first flyback voltage. A high voltage pulse, developed at a second terminal of the high voltage winding, has an amplitude that varies in accordance with the phase. A control circuit generates the control signal to vary the phase of the second flyback voltage relative to that of the first flyback voltage.

FIGS. 2a–2f illustrate waveform diagrams of the high voltage regulator circuit of FIG. 1;

FIG. 3 illustrates a waveform in which ringing occurs;

Figure 4A:
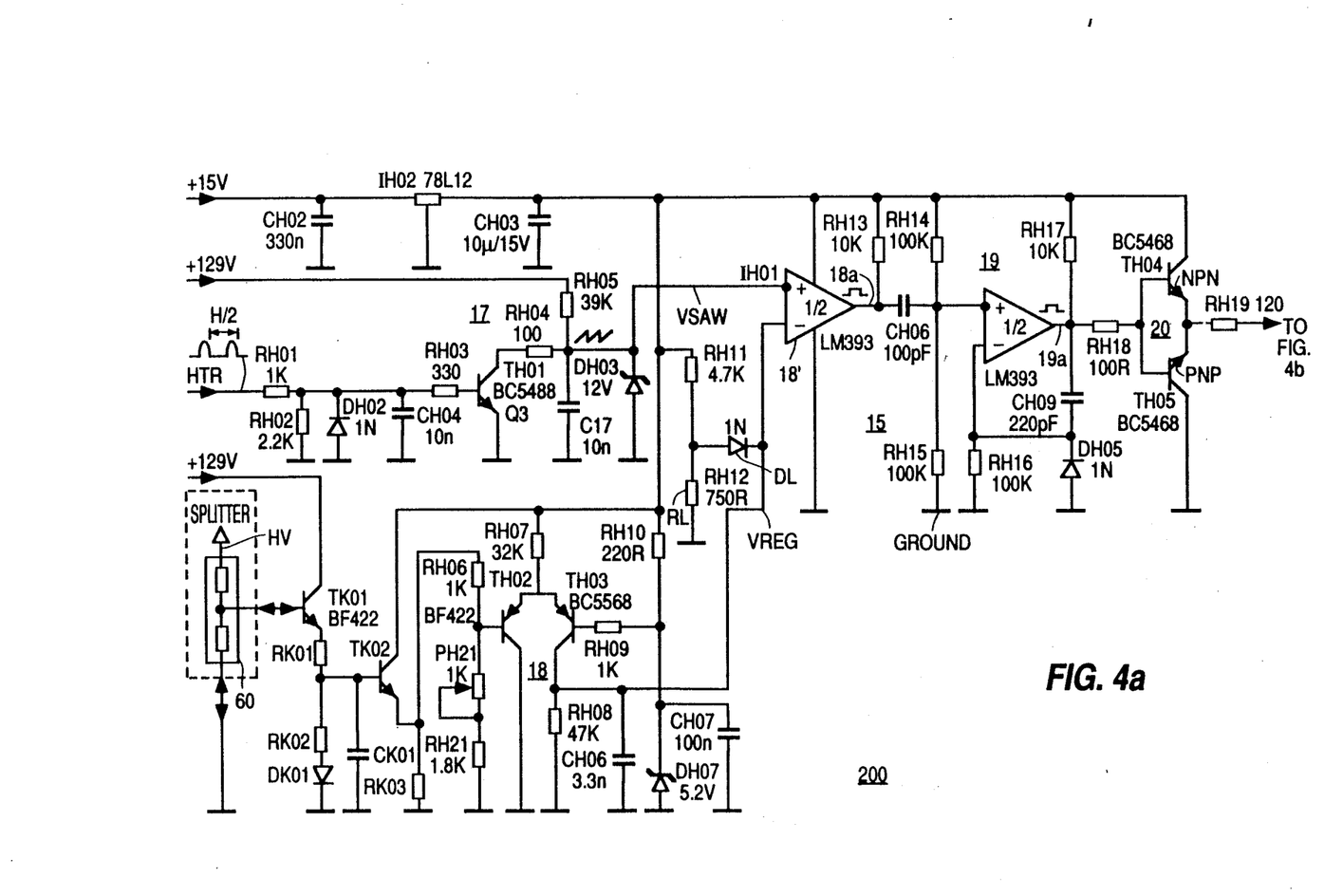
FIGS. 4a–4b are a schematic diagram of a high voltage regulator circuit, embodying an aspect of the invention, that prevents ringing such as shown in FIG. 3 from affecting the ultor voltage.
Figure 4B:
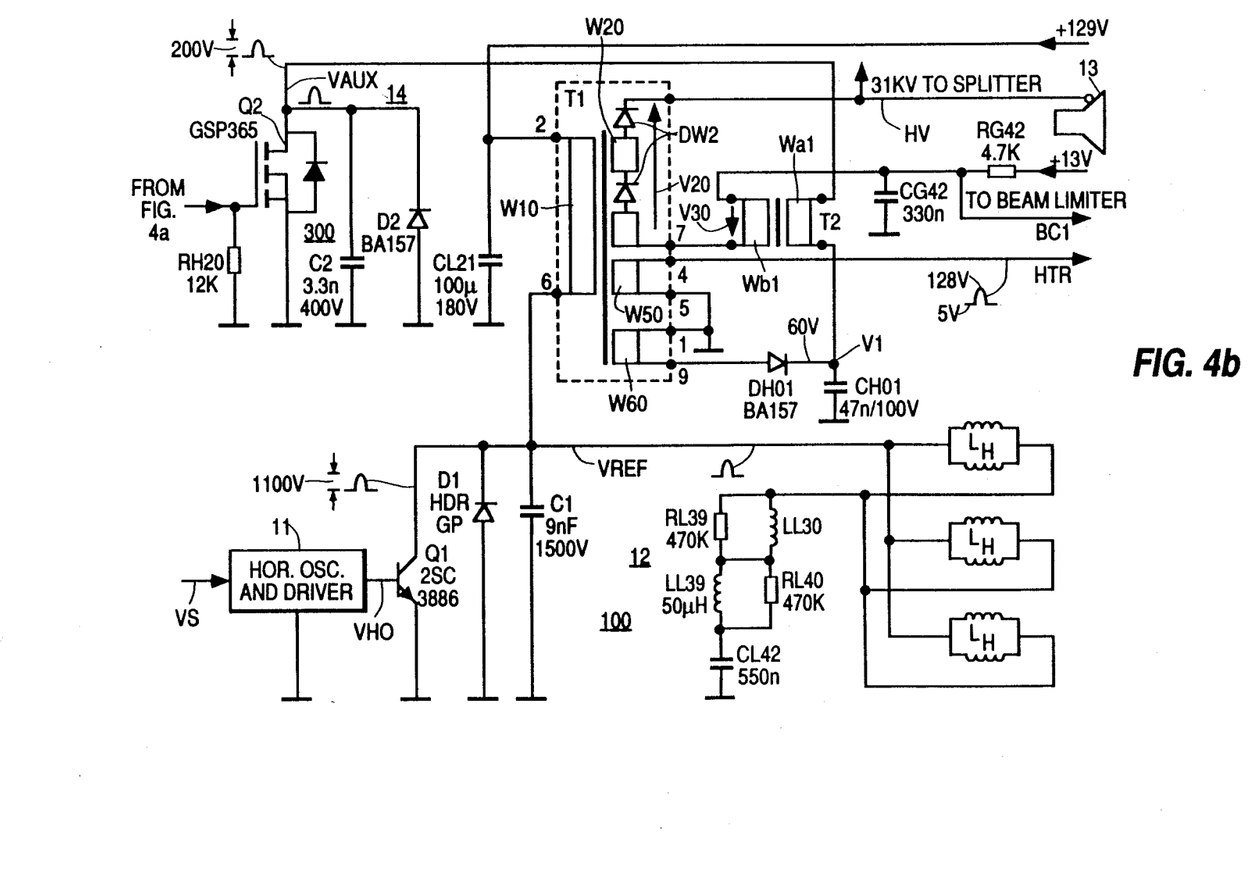

A high voltage regulator circuit 200 of FIG. 4, embodying an aspect of the invention, includes a horizontal deflection circuit 100 of, for example, a projection television receiver. A horizontal oscillator and driver stage 11 generates in response to a horizontal synchronization signal VS, obtained from a video detector, not shown, a control signal VHO. A switching transistor Q1 has a base electrode that is responsive to signal VHO. Signal VHO determines the switching timing of transistor Q1. The collector of transistor Q1 is coupled to a damper diode D1 and to a deflection retrace resonant circuit 12. Resonant circuit 12 includes a retrace capacitor C1, a primary winding W10 of a flyback transformer T1 and a parallel arrangement of three horizontal deflection windings $L_H$ for corresponding three picture tubes of the projection television receiver. For illustration purposes, only one picture tube of the three picture tube 13 is shown in FIG. 4.

As a result of the switching operation of transistor Q1 a retrace voltage VRET is developed across winding W10 in a well known manner. Voltage VRET is transformer coupled to a tertiary winding W20 for producing a first high voltage component V20 across winding W20 at a reference or constant phase relative to that of signal VS.

An auxiliary control voltage generator 300 includes a MOS switching transistor Q2 having switching timing that is controlled by an output signal 19a of a lagged pulse generator or one-shot multivibrator 19. Signal 19a is coupled to a gate electrode of transistor Q2 via a driver stage 20 that includes complementary transistors TH04 and TH05. A damper diode D2 is coupled in an antiparallel manner across transistor Q2. A drain electrode of transistor Q2 is coupled to an auxiliary flyback resonant circuit 14. Resonant circuit 14 includes a winding Wa1 of transformer T2 and a flyback capacitor C2.

A retrace voltage that is developed across a winding W60 of transformer T1 is rectified for producing an energizing voltage V+ that is coupled to primary winding Wa1 of transformer T2. As a result of the switching operation of transistor Q2, a pulse of an auxiliary flyback voltage VAUX is developed across winding Wa1 that is energized by voltage V+. The pulse of voltage VAUX is transformer coupled to a winding Wb1 of transformer T2 for developing an auxiliary, second voltage component V30 across winding Wb1 at a peak amplitude that is substantially smaller than that of voltage component V20. Winding Wb1 is coupled in series with winding W20 of transformer T1. Consequently, voltage components V20 and V30 are additively summed and rectified by tertiary diodes DW2 for producing an ultor voltage HV. Ultor voltage HV is coupled to an ultor terminal of, for example, picture tube 13 without a need for a voltage tripler that is used in the Haferl patent arrangement.

By varying its phase, a magnitude of a portion of voltage component V30 that occurs during a given retrace interval of voltage VRET increases in response to a corresponding increase in the beam current of picture tube 13. Consequently, ultor voltage HV is maintained regulated, or substantially constant for reasons similar to those explained in the Haferl patent that is incorporated by reference herein.

The compensation function of auxiliary voltage component V30 is obtained in a negative feedback phase control circuit 15. Control circuit 15, for example, increases the phase difference between the phase of the flyback pulse of voltage VAUX and the reference phase of retrace voltage VRET when voltage HV would, otherwise, tend to decrease.

In phase control circuit 15, voltage HV is coupled in a feedback manner to a noninverting input terminal of a conventional differential amplifier 18 via a splitter resistor 60 and emitter follower transistors TK01 and TK02. Amplifier 18 produces a reference signal VREG at a level that varies in accordance with that of voltage HV.

FIGS. 5A-5E and 6A-6C illustrate waveforms useful for explaining the operation of the circuit of FIG. 4. Similar symbols and numerals in FIGS. 4 and 5A-5E and 6A-6C indicate similar items or functions. The dashed lines in FIGS. 5B-5E and 6A-6C are representative of a high beam current condition; whereas the corresponding solid lines, represent a low beam current condition.

Figures 5A, 5B:
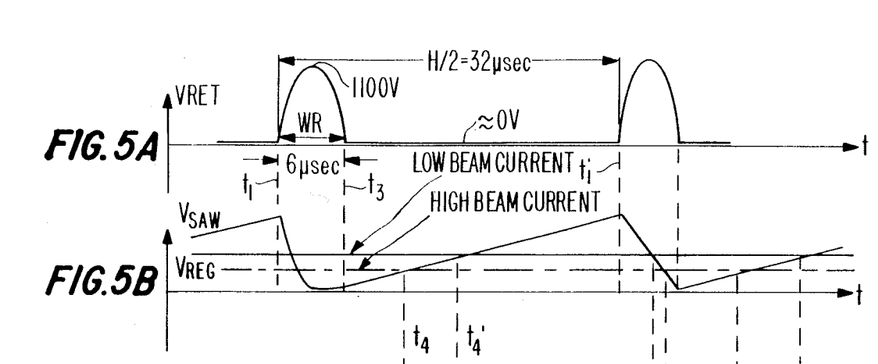
FIGS. 5A to 5E are idealized waveform diagrams useful for illustrating the operation of the high voltage regulator circuit of FIG. 4.

A sawtooth waveform generator 17 of FIG. 4 includes a transistor Q3 that is turned on during each horizontal retrace by the operation of a retrace signal HTR that is developed across a winding W50 of transformer T1. Signal HTR causes a signal VSAW developed across a capacitor C17 to be downramping, as shown in FIG. 5B during a portion of interval $t_1-t_3$. During each horizontal trace, such as interval $t_3-t_1'$, signal VSAW is upramping.

Signal VSAW is coupled to a noninverting input terminal of a comparator 18; whereas, signal VREG is coupled to an inverting input terminal of comparator 18. At a crossover point, when signal VSAW becomes more positive than signal VREG, such as at time $t_4$ of FIG. 5B, corresponding to a high beam current condition, or at time $t_4'$, corresponding to a low beam current condition, a falling edge occurs in an output signal 18a of FIG. 5C of comparator 18 of FIG. 4. Thus, the falling edge of signal 18a of FIG. 5C occurs later in the cycle or further delayed in the low beam current condition.

Signal 18a is coupled to an input terminal of one-shot multivibrator 19. Multivibrator 19 generates a rising edge of pulse signal 19a of FIG. 5D. Signal 19a is at a high level during an interval having a constant length PW. The length PW is independent on the timing of signal 18a of FIG. 5C.

Figures 5C, 5D:
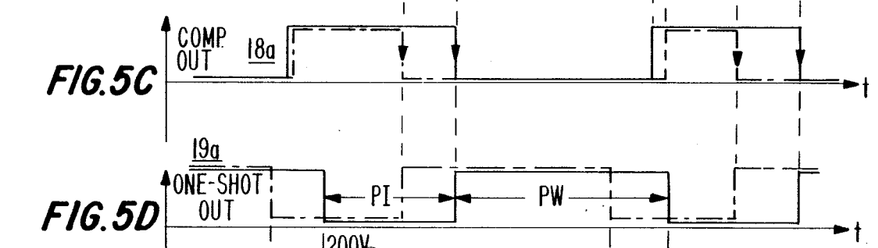

At, for example, time $t_{2A}$ of FIG. 5D, that corresponds to a high beam current condition, the falling edge of signal 19a occurs. On the other hand, at the low beam current condition, the falling edge of signal 19a occurs at a later time, $t_{2B}$. Thus, signal 19a of FIG. 5D is at a low level during an interval having a length PI. The length PI is also constant and is independent on the timing of signal 18a of FIG. 5C. The length PI of FIG. 5D is, for example, longer than twice the pulse width WR of retrace voltage VRET of FIG. 5A. For example, when the width WR is equal to 6 microseconds, the length PI may be of the order of 15 microseconds.

Figure 5E:
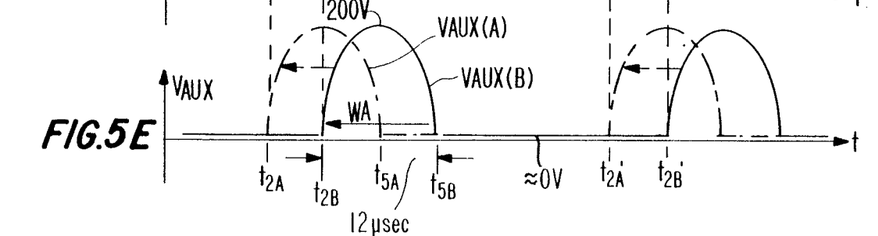

Signal 19a of FIG. 4 is coupled to the gate of transistor Q2, as explained before. When signal 19a is at the high level, transistor Q2 is conductive and no pulse occurs in voltage VAUX of FIG. 5E that is maintained at a low level. When the falling edge of signal 19a of FIG. 5D occurs, a corresponding pulse of flyback auxiliary voltage VAUX of FIG. 5E is initiated such as at time $t_{2A}$, for the high beam current condition, or at time $t_{2B}$, for the low beam current condition. The earlier the pulse of voltage VAUX occurs, for example, within retrace interval $t_1-t_3$, the larger is its contribution to voltage HV of FIG. 4. Variation of the phase of the pulse of voltage VAUX of FIG. 5E, or its initiation time, occurs in a negative feedback manner to compensate, for example, for the beam current variation.

In accordance with an aspect of the invention, voltage VAUX lags in phase relative to that of voltage VRET of FIG. 5A. Also, the phase of voltage component V30 lags relative to that of voltage component V20. Consequently, the end time of each pulse of, for example, voltage VAUX, such as time $t_{54}$, and at least a part of the trailing portion of the pulse, such as part VAUX(A), occur outside retrace interval $t_1$–$t_3$ of FIG. 5A.

Therefore, any ringing in voltage component V30 of FIG. 4 that may occur during or after, for example, the occurrence of part VAUX(A), advantageously, cannot affect ultor voltage HV of FIG. 4 since such ringing occurs outside retrace interval $t_1$–$t_3$ of FIG. 5A when voltage VRET is approximately zero. Had such ringing been allowed to affect voltage HV, it might have caused a phase reversal in the feedback loop. Had a phase reversal been permitted to occur, a decrease in voltage HV might have caused the feedback loop, disadvantageously, to, for example, further decrease voltage HV of FIG. 4.

Unlike in the Haferl patent arrangement, no voltage tripler is used in the arrangement of FIG. 4. Advantageously, this feature may reduce the cost of the power supply. However, to obtain the required level of voltage HV, more winding turns in the transformers may be required in the arrangement of FIG. 4.

The need for preventing the aforementioned ringing from affecting voltage HV is particularly significant when the number of winding turns in the windings of the transformers is large. This is so since large number of winding turns tends to produce such ringing at frequencies and amplitudes that may have adverse effect on the regulation of voltage HV. Thus, the arrangement of FIG. 4, that does not utilize any voltage multiplier, advantageously, eliminates any adverse of such ringing.

The width WA of the pulse of voltage VAUX of FIG. 5E is maintained substantially wider, such as 12 microseconds than, for example, that of voltage VRET. Therefore, the harmonics in transformer T2 of FIG. 4 are at low frequencies. Therefore, advantageously, the design requirements from transformer T2 are tolerant or relaxed despite the fact that the number of winding turns is large.

Figure 6A:
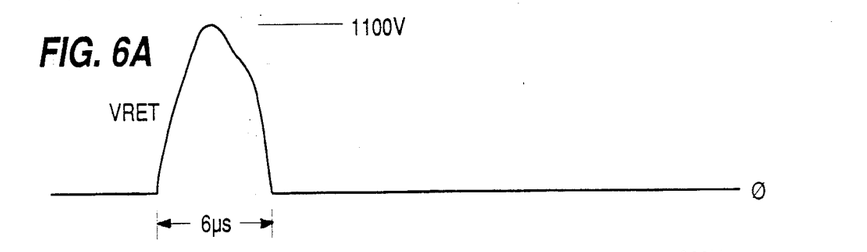
FIGS. 6A–6C illustrate additional waveforms useful for explaining the operation of the circuit of FIG. 4.
Figure 6B:
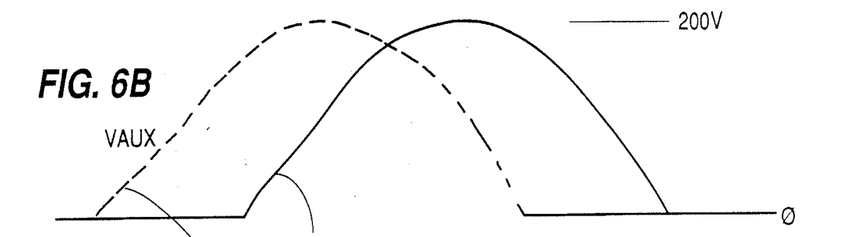

At zero beam current, representing one extreme case, the pulse of voltage VAUX of FIG. 6B is initiated after tertiary diodes DW2 of FIG. 4 cease conducting. Consequently, voltage component V30 of FIG. 6C has been maintained negative throughout retrace. Therefore, voltage component V30 tends to cause a decrease in voltage HV of FIG. 4.

Figure 6C:
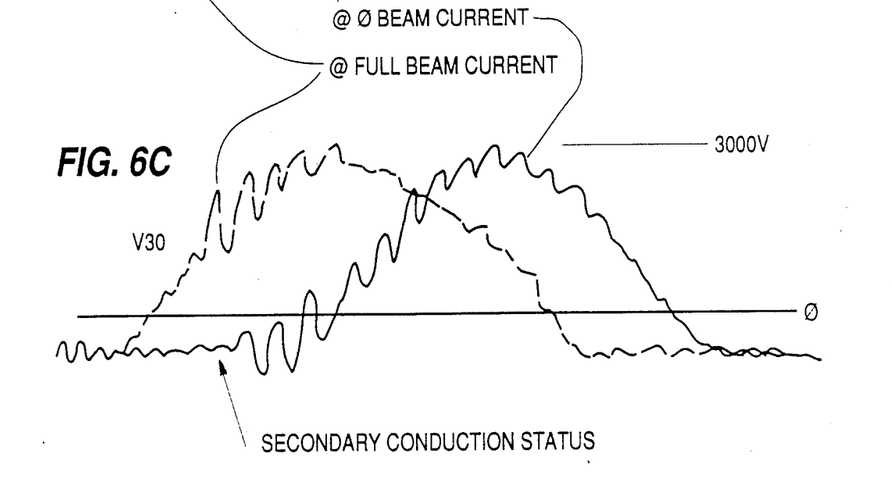

On the other hand, at maximum beam current, representing the other extreme case, voltage component V30 of FIG. 6C begins increasing prior to the conduction time of diodes DW2 of FIG. 4. Therefore, voltage component V30 is sufficiently positive to compensate for the tendency of voltage HV to drop. Within the regulation range that lies between these extreme cases, the phase of voltage VAUX is, for example, further delayed as the beam current decreases.

In order to prevent phase reversal in the feedback loop it may be desirable to prevent the initiation of the pulse of auxiliary voltage VAUX of FIG. 6B from occurring earlier than a predetermined instant.

In accordance with another aspect of the invention, a cathode of a diode DL of FIG. 4 is coupled to the inverting input terminal of comparator 18. The anode of diode DL is coupled to a DC voltage that is developed across a resistor RL of a voltage divider. Diode DL prevents, by a clamping action, voltage VREG from decreasing below a predetermined level. Thereby, the earliest trigger timing of one-shot multivibrator 19 is limited. The result is that the earliest initiation time of the pulse of voltage VAUX of FIG. 5E is also limited.

What is claimed is:
1. A high voltage regulator circuit for a picture tube comprising:
 a horizontal deflection circuit including a resonant output stage for generating a retrace voltage signal having pulses of a given width and retrace frequency;
 a flyback transformer having a primary winding receiving the retrace voltage signal from the resonant output stage of the horizontal deflection circuit and a secondary winding for generating a high voltage component of an ultor voltage to be applied to the picture tube in accordance with the retrace frequency;
 an auxiliary resonant circuit for generating an auxiliary voltage signal having pulses of the given retrace frequency for compensating beam current variations affecting the ultor voltage;
 an auxiliary transformer in series with the flyback transformer having a primary winding receiving the auxiliary voltage signal from the auxiliary resonant circuit and a secondary winding for generating an auxiliary voltage component which is added to the high voltage component of the ultor voltage; and
 a phase control circuit responsive to the ultor voltage for controlling the phase position of the auxiliary voltage signal pulses such that they lag the retrace voltage signal pulses at a low beam current, and are advanced so that leading parts thereof overlap the retrace voltage signal pulses at a high beam current, whereby the ultor voltage is maintained substantially constant despite variations in the beam current, and secondary ringing in the auxiliary voltage component of the ultor voltage is precluded.

2. A high voltage regulator circuit for a picture tube according to claim 1, wherein the sum of the high voltage component and the auxiliary voltage component of the flyback and auxiliary transformers is applied as the ultor voltage directly to the picture tube.

3. A high voltage regulator circuit for a picture tube according to claim 1, wherein said phase control circuit includes a sawtooth waveform generator which generates a sawtooth signal having a falling component corresponding to the retrace voltage signal pulses, a reference voltage generator which generates a reference voltage corresponding to the ultor voltage, a comparator for comparing the sawtooth signal to the reference voltage and generating a first pulse signal corresponding to crossover points thereof, and a lagged pulse generator circuit responsive to the first pulse signal for generating a second pulse signal lagging in phase to the retrace voltage signal pulses.

4. A high voltage regulator circuit for a picture tube according to claim 3, wherein said sawtooth waveform generator generates the sawtooth signal having a rising component lagging in phase to the retrace voltage signal pulses said comparator generates output pulses having falling edges corresponding to crossover points of the rising component of the sawtooth signal with the reference voltage, and said lagged pulse generator is a one-shot multivibrator circuit for generating one-shot pulses of a fixed pulse width with rising edges corresponding to the falling edges of the comparator output pulses.

5. A high voltage regulator circuit for a picture tube according to claim 4, wherein intervening intervals between said one-shot pulses have a width of about twice that of the retrace voltage signal pulses, and the one-shot pulses are used in conjunction with the auxiliary resonant circuit to generate the auxiliary claim 5 continued: voltage signal having pulses lagging the retrace voltage signal pulses having a width of about twice the width of the retrace voltage signal pulses.

6. A high voltage regulator circuit for a picture tube according to claim 1, wherein the auxiliary resonant circuit includes a second switching transistor, a damper diode, and a retrace capacitor.

7. A high voltage regulator circuit for a picture tube according to claim 5, wherein the resonant output stage of the horizontal deflection circuit includes a second switching transistor which is rendered nonconducting during the intervals of the one-shot pulses and conducting during the intervening intervals between the one-shot pulses, a damper diode, and a retrace capacitor.

8. In a high voltage regulator circuit for a picture tube, of the type having a horizontal deflection circuit including a resonant output stage for generating a retrace voltage signal having pulses of a given width and retrace frequency, a flyback transformer coupled to the retrace voltage signal for generating a high voltage component of an ultor voltage to be applied to the picture tube, an auxiliary resonant circuit for generating an auxiliary voltage signal having pulses of the given retrace frequency for compensating beam current variations affecting the ultor voltage, and an auxiliary transformer coupled to the auxiliary voltage signal for generating an auxiliary voltage component which is added to the high voltage component of the ultor voltage, the improvement comprising:

a phase control circuit responsive to the ultor voltage for controlling the phase position of the auxiliary voltage signal pulses such that they lag the retrace voltage signal pulses at a low beam current, and are advanced so that leading parts thereof overlap the retrace voltage signal pulses at a high beam current, whereby the ultor voltage is maintained substantially constant despite variations in the beam current, and secondary ringing in the auxiliary voltage component of the ultor voltage is precluded.

9. An improved phase control circuit for a high voltage regulator circuit according to claim 8, including a sawtooth waveform generator which generates a sawtooth signal having a falling component corresponding to the retrace voltage signal pulses, a reference voltage generator which generates a reference voltage corresponding to the ultor voltage, a comparator for comparing the sawtooth signal to the reference voltage and generating a first pulse signal corresponding to crossover points thereof, and a lagged pulse generator circuit responsive to the first pulse signal for generating a second pulse signal lagging in phase to the retrace voltage signal pulses.

10. An improved phase control circuit for a high voltage regulator circuit according to claim 9, wherein said sawtooth waveform generator generates the sawtooth signal having a rising component lagging in phase to the retrace voltage signal pulses, said comparator generates output pulses having falling edges corresponding to crossover points of the rising component of the sawtooth signal with the reference voltage, and said lagged pulse generator is a one-shot multivibrator circuit for generating one-shot pulses of a fixed pulse width with rising edges corresponding to the falling edges of the comparator output pulses.

11. An improved phase control circuit for a high voltage regulator circuit according to claim 10, wherein intervening intervals between said one-shot pulses have a width of about twice that of the retrace voltage signal pulses, and the one-shot pulses are used in conjunction with the auxiliary resonant circuit to generate the auxiliary voltage signal having pulses lagging the retrace claim 11 continued: voltage signal pulses having a width of about twice the width of the retrace voltage signal pulses.

12. A high voltage power supply of a video apparatus, comprising:

a source of an input signal at a frequency that is related to a deflection frequency;

a first flyback resonant circuit;

first switching means responsive to said input signal and coupled to said first flyback resonant circuit for generating a periodic, resonant first flyback voltage at a reference phase that is developed across a high voltage winding of a flyback transformer;

a second flyback resonant circuit;

second switching means responsive to a control signal and coupled to said second flyback resonant circuit for generating at a first terminal of said high voltage winding a periodic, resonant second flyback voltage at a controllable phase that lags relative to that of said first flyback voltage that is applied in series with said first flyback voltage such that a high voltage pulse is developed at a second terminal of said high voltage winding having an amplitude that varies in accordance with said phase;

a load coupled to said second terminal and energized by said high voltage pulse for developing a load current therein; and a control circuit for generating said control signal to vary the phase of said second flyback voltage relative to that of said first flyback voltage such that a decrease in said load current causes a phase lag increase of said second flyback voltage.

13. A high voltage power supply of a video apparatus, comprising:

a source of an input signal at a frequency that is related to a deflection frequency;

a first flyback resonant circuit;

first switching means responsive to said input signal and coupled to said first flyback resonant circuit for generating a periodic, resonant first flyback voltage pulse that is developed across a high voltage winding of a flyback transformer;

a second flyback resonant circuit;

second switching means responsive to a control signal and coupled to said second flyback resonant circuit for generating at a first terminal of said high voltage winding a periodic, resonant second flyback voltage at a controllable phase relative to said first flyback voltage that is applied in series with said first flyback voltage to develop a high voltage pulse at a second terminal of said high voltage winding having an amplitude that varies in accordance with said phase such that during and after the occurrence of a trailing portion of a given pulse of any one of said first and second flyback voltages, the other one of said first and second flyback voltages is prevented from affecting said amplitude of said high voltage pulse; and a control circuit for generating said control signal to vary the phase of said second flyback voltage relative to that of said first flyback voltage.

14. A high voltage power supply of a video apparatus, comprising:

a source of an input signal at a frequency that is related to a deflection frequency;

a first flyback resonant circuit;

first switching means responsive to said input signal and coupled to said first flyback resonant circuit for generating a periodic, resonant first flyback voltage pulse that is developed across a high voltage winding of a flyback transformer;

a second flyback resonant circuit;

second switching means responsive to a control signal and coupled to said second flyback resonant circuit for generating at a first terminal of said high voltage winding a periodic, resonant second flyback voltage pulse having a substantially smaller magnitude than a magnitude of said first flyback voltage pulse and having a controllable phase relative to that of said first flyback voltage pulse, said second flyback voltage pulse being applied in series with said first flyback voltage pulse to develop a high voltage pulse at a second terminal of said high voltage winding having an amplitude that varies in accordance with said controllable phase such that any ringing associated with a trailing portion of said second flyback voltage pulse which occurs after a termination time of a trailing portion of said first flyback voltage pulse is prevented from affecting said high voltage amplitude; and a control circuit for generating said control signal to vary the phase of said second flyback voltage relative to that of said first flyback voltage.

15. A high voltage power supply of a video apparatus, comprising:

a source of an input signal at a frequency that is related to a deflection frequency at a reference phase;

a first flyback resonant circuit;

first switching means responsive to said input signal and coupled to said first flyback resonant circuit for generating across a high voltage winding of a flyback transformer a periodic, resonant first flyback voltage at a reference phase;

a second flyback resonant circuit;

second switching mean responsive to a control signal and coupled to said second flyback resonant circuit for generating at a first terminal of said high voltage winding, in accordance with said control signal, a periodic, resonant second flyback voltage at a controllable phase that is lagging relative to said phase of said first flyback voltage, said second flyback voltage being applied in series with said first flyback voltage such that a high voltage pulse is developed at a second terminal of said high voltage winding having an amplitude that varies in accordance with said controllable phase; and a control circuit for generating said control signal to vary said controllable phase of said second flyback voltage relative to said reference phase of said first flyback voltage.

16. A power supply according to claim 15 wherein said first and second flyback voltages are at least partially overlapping.

17. A high voltage power supply according to claim 15 wherein said first flyback resonant circuit comprises a horizontal deflection winding and a flyback capacitance.

18. A high voltage power supply according to claim 15 wherein said flyback transformer comprises a primary winding that is coupled to said first flyback resonant circuit and wherein said high voltage winding comprises a tertiary winding of said flyback transformer.

19. A power supply according to claim 15 wherein a flyback resonance frequency of said second flyback resonant circuit is substantially lower than that of said first flyback resonant circuit.

20. A high voltage power supply according to claim 15 further comprising, rectifier means coupled to said high voltage winding for generating a rectified high voltage that is coupled to a load circuit wherein said control circuit is responsive to said rectified high voltage for varying said phase of said second flyback voltage in a negative feedback manner that stabilizes said rectified high voltage when a current that flows in said rectifier means varies.

21. A power supply according to claim 20 wherein said control circuit comprises, means for limiting the range of said controllable phase to prevent said negative feedback from changing to being a positive feedback.

22. A power supply according to claim 15 wherein said first and second flyback voltages are produced in windings that are magnetically separated to produce said high voltage pulse in accordance with a sum of said first and second flyback voltages.

* * * * *